US006491460B1

(12) United States Patent
Sodeyama et al.

(10) Patent No.: US 6,491,460 B1
(45) Date of Patent: Dec. 10, 2002

(54) TAPE PRINTING APPARATUS

(75) Inventors: Hideo Sodeyama, Matsumoto (JP); Hiroshi Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/633,562

(22) Filed: Aug. 7, 2000

(30) Foreign Application Priority Data

Aug. 12, 1999 (JP) ........................................... 11-228886

(51) Int. Cl.[7] ................................................ B32B 31/00

(52) U.S. Cl. .................... 400/613.1; 400/593; 400/613; 400/621

(58) Field of Search ................................ 400/613, 593, 400/621, 613.1, 615.2

(56) References Cited

U.S. PATENT DOCUMENTS 6,113,294 A * 9/2000 Niwa ......................... 400/621
6,116,796 A * 9/2000 Yamaguchi et al. ..... 400/615.2
6,145,561 A * 11/2000 Watanabe et al. ........... 156/517
6,196,740 B1 * 3/2001 Yamaguchi et al. ..... 400/615.2

FOREIGN PATENT DOCUMENTS

JP 10-175190 * 6/1998

* cited by examiner

*Primary Examiner*—Andrew H. Hirshfeld
*Assistant Examiner*—Kevin D. Williams
(74) *Attorney, Agent, or Firm*—Hogan & Hartson, LLP

(57) ABSTRACT

A tape printing apparatus has a tape exit having a slit defined by a pair of opening edges opposed to each other. The slit includes a tape setting space facing a cutter and a tape guide space defined on the tape setting space in a manner continuous with the tape setting space, for guiding a leading end portion of a printing tape to be inserted into the tape setting space from above. The tape guide space is formed such that said tape guide space extends in a curved manner.

4 Claims, 5 Drawing Sheets

TAPE PRINTING APPARATUS

BACKGROUND OF THE INVENTION

1. Field of the Invention

This invention relates to a tape printing apparatus which is capable of printing on a printing tape and cutting off the printed portion of the printing tape to thereby discharge the same therefrom via a tape exit thereof.

2. Prior Art

A conventional tape printing apparatus effects printing on a printing tape while feeding the same from a tape cartridge. The printed portion of the printing tape is sent out of the apparatus via a tape exit, finally cut off and discharged as a tape strip. In the apparatus, a cutter for cutting off the printed portion faces the tape exit, and the essential parts and elements of the cutter are arranged within an apparatus casing formed with the tape exit in the form of a slit. The slit forming the tape exit has an open upper end which allows a leading end portion of a printing tape to be inserted into the tape exit from above when a tape cartridge is mounted in a cartridge compartment.

In the above type of conventional tape printing apparatus, if the slit of the tape exit is formed to have a small width, a cut-off tape strip (printed portion) can be caught at the tape exit, which causes re-cutting of the cut-off tape strip or jamming of the same. On the other hand, if the slit of the tape exit is formed to have a large width, a problem can occur that while mounting a tape cartridge, the user inserts a finger into the tape exit accidentally. Further, it is not preferred that the tape exit is formed as a slit which can allow the user's finger to be inserted from the outside of the apparatus.

SUMMARY OF THE INVENTION

It is an object of the invention to provide a tape printing apparatus which is capable of discharging a cut-off tape strip via a tape exit smoothly without increasing the width of a slit of the tape exit.

To attain the above object, according to a first aspect of the present invention, there is provided a tape printing apparatus including a cartridge compartment in which a tape cartridge containing a printing tape is removably mounted, a tape exit formed such that the tape exit is continuous with the cartridge compartment and in the form of a slit having an open upper end, for discharging a printed portion of the printing tape from the apparatus, and a cutter facing the tape exit, the tape cartridge being inserted into the cartridge compartment, with a leading end portion of the printing tape which is rolled out from the tape cartridge being inserted into the tape exit from above.

The tape printing apparatus according to the invention is characterized in that the tape exit comprises a slit defined by a pair of opening edges opposed to each other, the slit including a tape setting space which the cutter faces, and a tape guide space extending upward continuously from the tape setting space, for guiding the leading end portion of the printing tape when the leading end portion is inserted into the tape setting space from above, and the tape guide space being formed such that the tape guide space extends in a curved manner.

According to this tape printing apparatus, the tape guide space is formed such that the tape guide space extends in a curved manner, so that when a tape cartridge is mounted, a leading end portion of a printing tape contained therein is allowed to be inserted into the tape guide space, whereas a user's finger is prevented from being inserted into the space even if the finger is brought thereto accidentally. This construction of the tape guide space not only makes it possible to ensure safety of the user from the cutter facing the tape exit, but also allows the tape exit to be formed to have a proper width so as to let a tape strip pass therethrough without being caught therein. On the other hand, the tape setting space extends linearly, and hence the leading end portion of the printing tape which has reached the tape setting space after being guided through the tape guide space is set in a state extending linearly, so that the feed of the printing tape cannot be hindered.

Preferably, at least one of the pair of opening edges has an upper end thereof formed with a sloped surface sloped downward toward the tape guide space.

According to this preferred embodiment, by utilizing the sloped surface, it is possible to guide the leading end portion of a printing tape thereby causing the same to be smoothly inserted into the tape guide space. In this preferred embodiment, it is more preferable that each of the two opening edges has its upper end formed with the sloped surface.

Preferably, the tape exit has a pair of opening walls extending outward from the pair of opening edges, respectively, such that a space between the pair of opening walls broadens toward an outside of the apparatus.

According to this preferred embodiment, even if the user's finger is inserted into the tape exit from the outside of the apparatus, i.e. from the front of the tape exit, the pair of opening walls block the finger and inhibit the same from being inserted more deeply, thereby maintaining safety of the user from the cutter facing the tape exit. Further, this construction enables smooth discharge of a cut-off tape strip from the apparatus.

To attain the above object, according to a second aspect of the invention, there is provided a tape printing apparatus including a cartridge compartment in which a tape cartridge containing a printing tape is removably mounted, a tape exit formed such that the tape exit is continuous with the cartridge compartment and in the form of a slit, for discharging a printed portion of the printing tape from the apparatus, and a cutter facing the tape exit.

The tape printing apparatus is characterized in that the cutter comprises a stationary blade arranged within the apparatus and a movable blade arranged within the apparatus at a location outward of the stationary blade, the tape exit being in the form of a slit defined by a pair of opening edges opposed to each other, and one of the opening edges on a side of the movable blade being positioned at a location close to a cutting line of the cutter, while another of the opening edges being positioned at a location remote from the cutting line.

According to this tape printing apparatus, the movable blade of the cutter is arranged in the apparatus at a location outward of the stationary blade, so that when the movable blade performs a cutting operation to cut a printing tape, the motion of the movable blade causes the cut-off tape strip to be discharged (thrown out) obliquely with respect to a tape dispensing direction (direction in which the tape extends) in a manner deviated toward the stationary blade side as viewed from the front of the tape exit. Accordingly, by arranging the movable blade-side opening edge at a location close to the cutting line of the cutter, and the other opening edge at a location remote from the cutting line, that is, by forming the tape exit such that the vertical center line thereof is deviated from the cutting line toward the stationary blade, the apparatus is capable of discharging a tape strip smoothly without increasing the width of the tape exit. Thus, the tape exit can be formed to have a relatively small width, without causing any trouble in discharging a tape strip, whereby it is possible to ensure safety of the user from the cutter facing the tape exit.

Preferably, the tape exit has a pair of opening walls extending outward from the pair of opening edges, respectively, such that a space between the pair of opening walls broadens toward an outside of the apparatus.

According to this preferred embodiment, even if the user's finger is inserted into the tape exit from the outside of the apparatus, i.e. from the front of the tape exit, the pair of opening walls block the finger and inhibit the same from being inserted more deeply. Therefore, this construction also makes it possible to ensure safety of the user from the cutter facing the tape exit.

More preferably, one of the opening walls on a side of the stationary blade extends outward at a wider opening angle with respect to a direction of dispensing the printing tape than another of the opening walls on the side of the movable blade.

According to this preferred embodiment, it is possible to prevent a cut-off tape strip to be discharged or thrown out via the tape exit from being caught at the stationary blade-side opening wall, thereby enabling more smooth discharge of the tape strip.

Further preferably, the movable blade-side opening wall extends outward in parallel with the direction of dispensing the printing tape.

This preferred embodiment can provide the same advantageous effects as obtained by the above embodiment.

The above and other objects, features, and advantages of the invention will become more apparent from the following detailed description taken in conjunction with the accompanying drawings.

DETAILED DESCRIPTION

The invention will now be described in detail with reference to drawings showing a tape printing apparatus according to an embodiment thereof.

The tape printing apparatus is capable of printing on a printing tape as desired according to key entries and cutting off the printed portion of the printing tape. The cut-off strip of the printing tape is used as a label to be affixed to a document file or the like. That is, the tape printing apparatus makes a label printed with characters from plain printing tape. The plain printing tape and an ink ribbon to be consumed in the tape printing are contained in a tape cartridge, and fed to the main unit of the apparatus via the tape cartridge.

Figure 1:
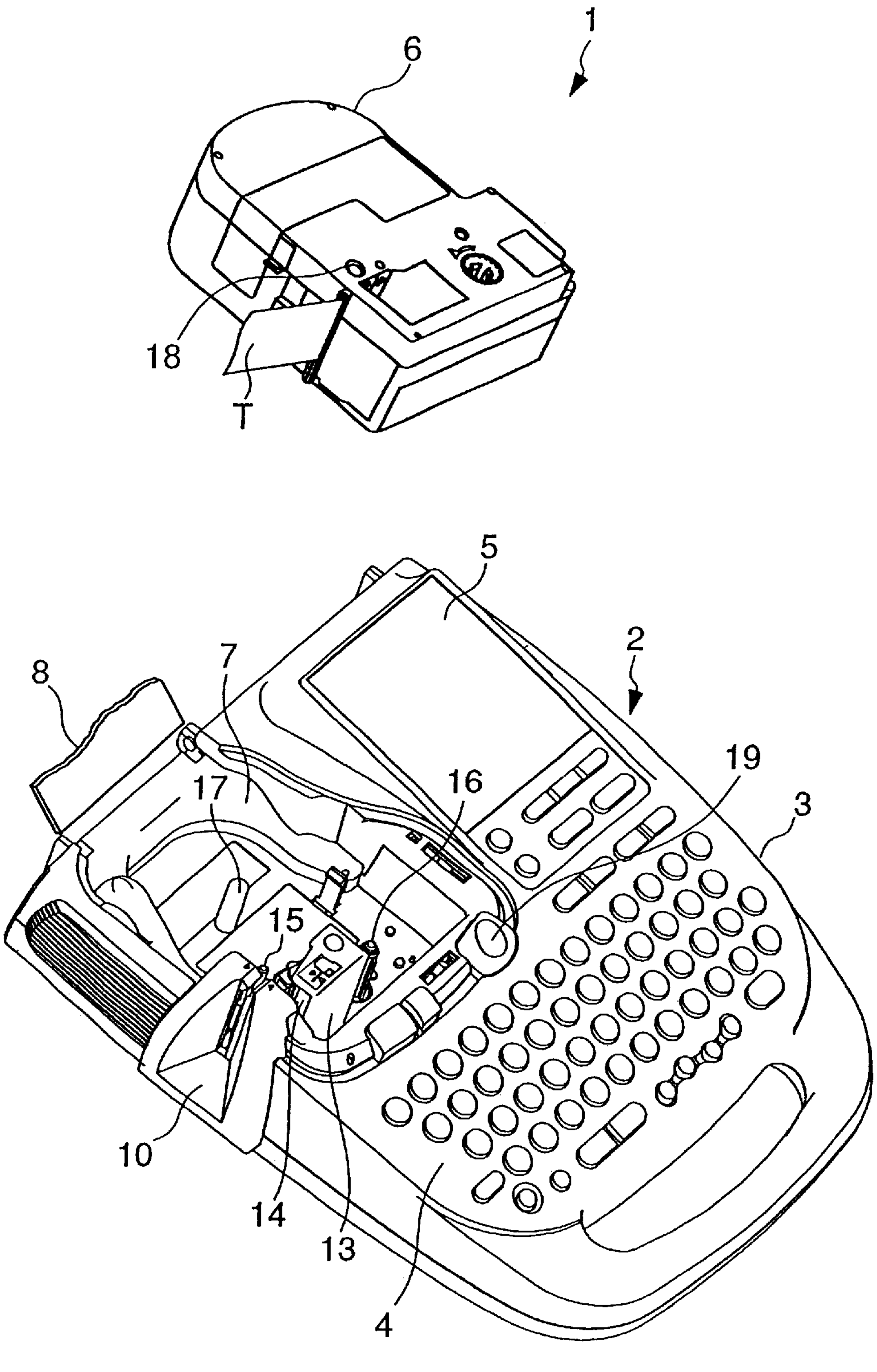
FIG. 1 is a perspective view of a tape printing apparatus according to an embodiment of the invention.

Referring first to FIG. 1, the tape printing apparatus 1 has an apparatus body 2 having an apparatus casing 3 formed of upper and lower divisional portions. The tape printing apparatus 1 has a key entry block 4 arranged on the top of the front portion of the apparatus casing 3, a liquid crystal display 5 arranged on the top of the right-side rear portion of the same, and a cartridge compartment 7 formed in the left-hand rear portion of the same, for receiving a tape cartridge 6 therein. The cartridge compartment 7 has a lid 8 formed with a window. The lid 8 is attached to the apparatus body 2, for opening and closing the cartridge compartment 7. The apparatus casing 3 has a left side portion thereof formed with a tape exit 10 that communicates between the cartridge compartment 7 and the outside of the apparatus 1, and a tape cutter 11 is arranged to face the tape exit 10, for cutting off a dispensed portion of a printing tape T (see FIGS. 4 and 5). The tape cutter 11 is linked to an automatic cutting mechanism 12 (partly shown in FIG. 5) which causes the tape cutter 11 to perform cutting operations.

In the cartridge compartment 7, there are erected a print head 14 covered with a head cover 13, a platen shaft 15 opposed to the print head 14, a reel shaft 16 for taking up used part of an ink ribbon, and a guide projection 17 for guiding a tape cartridge 6 when it is mounted in the cartridge compartment 8. A platen 18 for engagement with the platen shaft 15 is incorporated in the tape cartridge 6. The platen 18, the platen shaft 15, and the, reel shaft 16 belong to a tape feed mechanism whose main components, not shown, are arranged under the cartridge compartment 7.

When a label is to be produced by the use of the tape printing apparatus 1, first, an opening button. 19 located on a corner of the lid 8 is pushed or depressed to let the lid 8 pop up to a half-open position, and then the lid 8 is fully opened by hand. Subsequently, the tape cartridge 6 is mounted in the cartridge compartment 7 from above. After the tape cartridge 6 is mounted, the lid 8 is closed to place the tape printing apparatus 1 in a printing wait state. Then, the user operates the key entry block 4 while viewing keyed inputs on the liquid crystal display 5, whereby desired characters, figures, or the like are entered. When the entry of the desired characters, figures, etc. has been verified on the liquid crystal display 5, the key entry block 4 is further operated to instruct the apparatus 1 to execute printing of the entered characters, figures, etc.

When a print command is issued, the printing tape T and the ink ribbon contained in the tape cartridge 6 start to be rolled out simultaneously, and printing is effected on the printing tape T by the print head 14 as desired. During the printing operation, used part of the ink ribbon is taken up within the tape cartridge 6, while a printed portion of the printing tape T is sent out of the apparatus 1 via the tape exit 10. When the printing operation is completed, the printing tape T is further fed by an amount corresponding to a trailing blank space, and then the feed of the printing tape T and the ink ribbon is stopped. Then, the automatic cutting mechanism 12 is operated to cause the tape cutter 11 to cut off the printed portion of the printing tape T.

Next, the tape cutter 11 will be described in detail with reference to FIG. 5, and the tape exit 10 with reference to FIGS. 2, 3, and 4.

Figure 5:
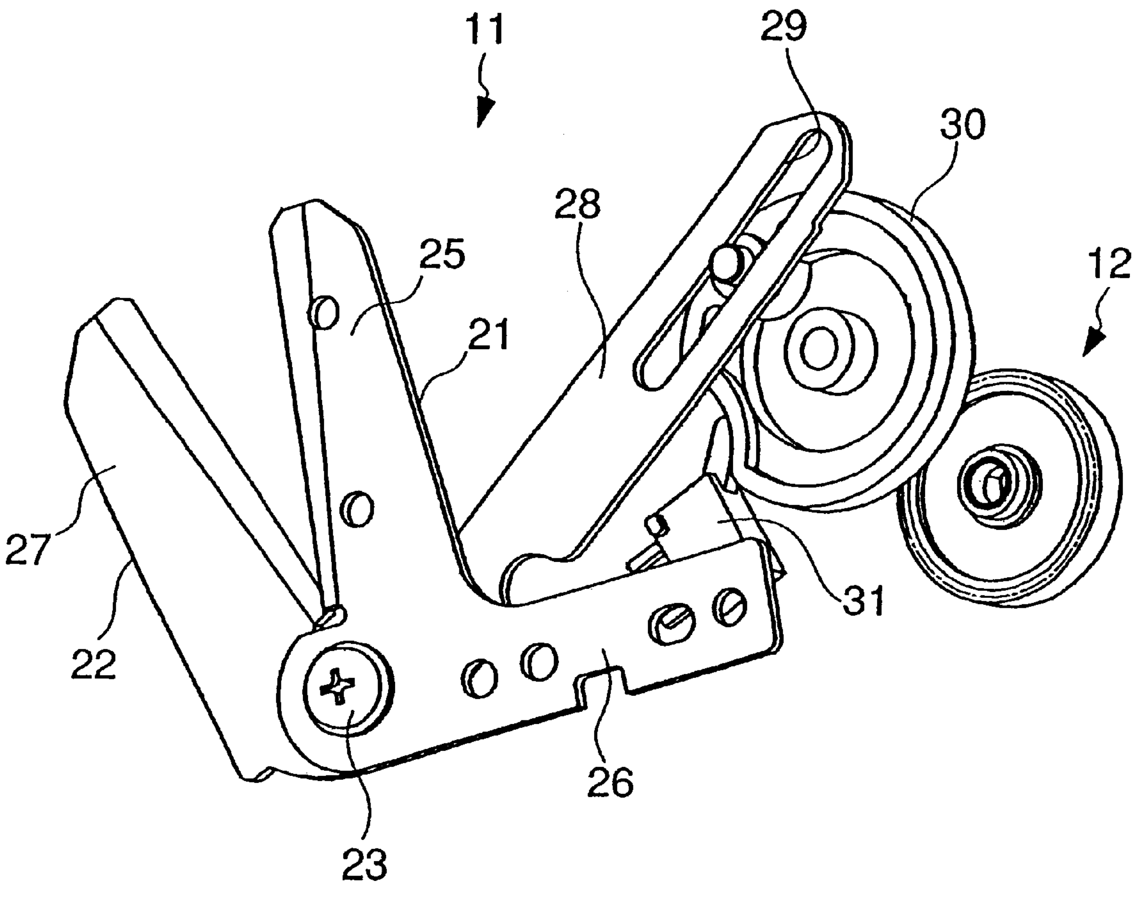
FIG. 5 is an enlarged perspective view of a tape cutter of the FIG. 1 tape printing apparatus.

Referring first to FIG. 5, there is shown the tape cutter 11 as viewed from the inside of the apparatus body 2. As shown in the figure, the tape cutter 11 is comprised of a stationary blade 21 and a movable blade 22. The two blades 21, 22 are coupled to each other by a pivot 23 such that the movable blade 22 can be pivotally moved to perform cutting operations on the stationary blade 21. The stationary blade 21 is comprised of a blade body 25 and a cutter arm 26 integrally formed with the blade body 25 and extending from the root of the blade body 25 substantially at right angles to the blade body 25. The stationary blade 21 is attached to a base frame, not shown, with the cutter arm 26 thereof fixed to the same.

Similarly, the movable blade 22 is comprised of a blade body 27 and a cutter arm 28 integrally formed with the blade body 27 and extending from the root of the blade body 27 substantially at right angles to the blade body 27. The cutter arm 28 is formed with a slot 29 for constant engagement with a crank disk 30. The movable blade 22 is arranged at a location outward of the stationary blade 21, so that when the movable blade 22 performs a cutting operation, a cut-off tape strip Ta is automatically discharged (thrown out) from the apparatus body 2. It should be noted that reference numeral 31 designates a detecting switch for detecting the home position (state of the two blades being open apart) of the tape cutter 11.

Figure 2:
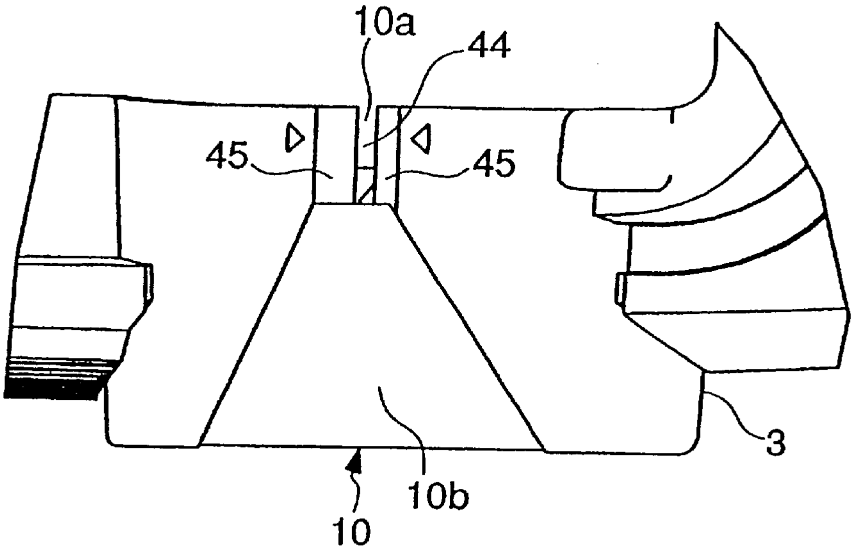
FIG. 2 is an enlarged plan view of a tape exit of the FIG. 1 tape printing apparatus.
Figure 3:
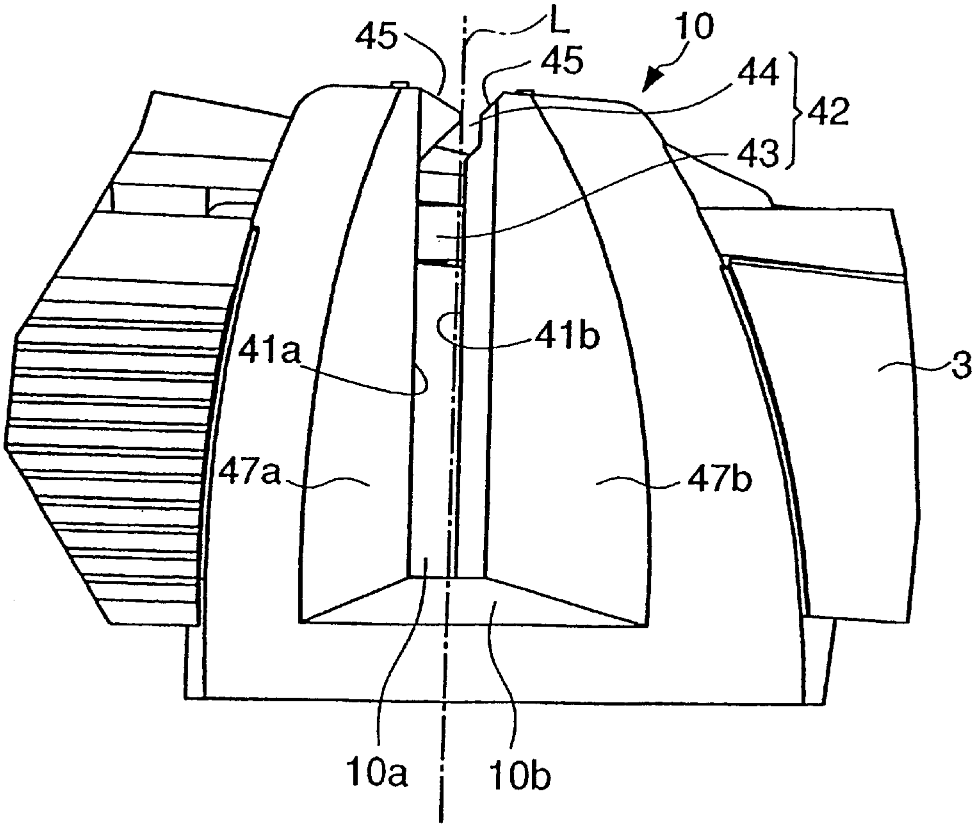
FIG. 3 is an enlarged front view of the FIG. 2 tape exit.
Figure 4:
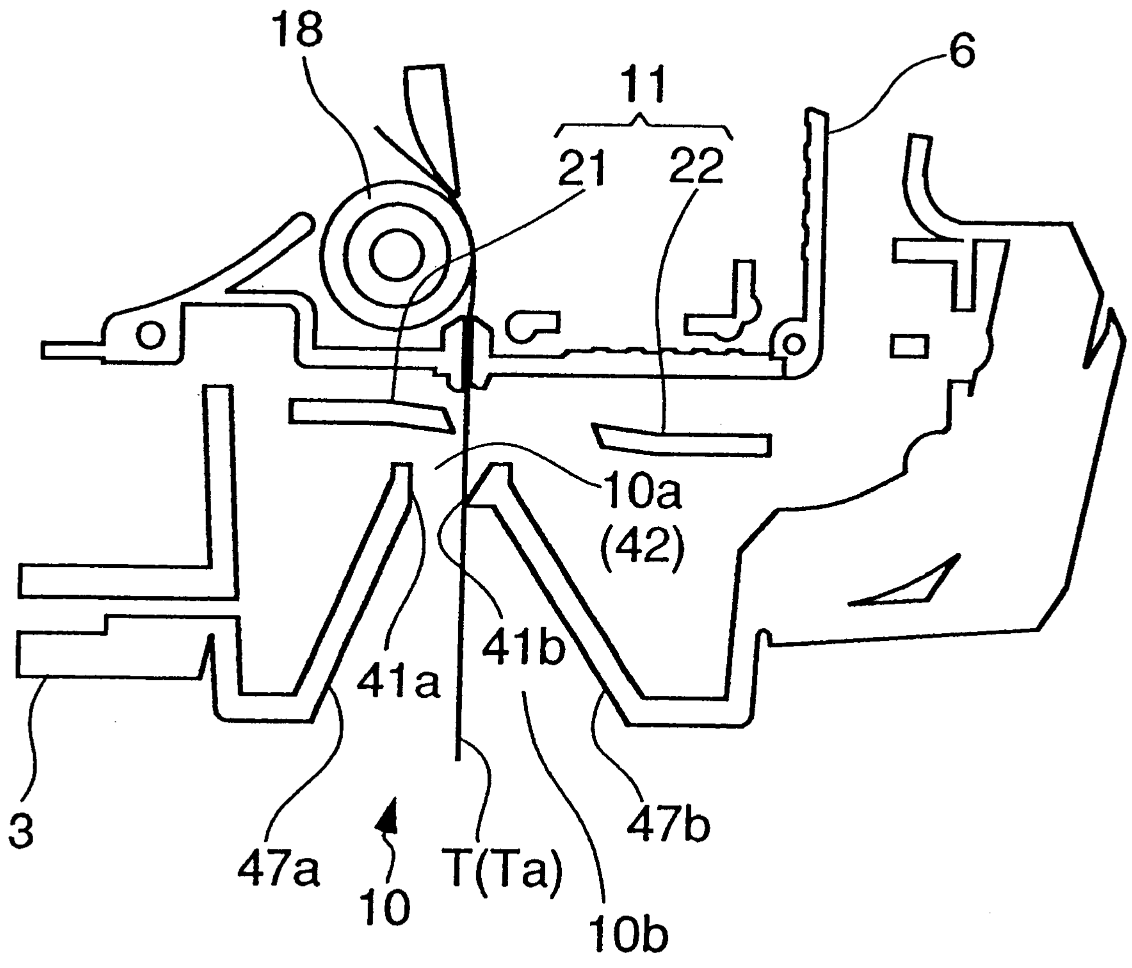
FIG. 4 is a transverse sectional view of the tape exit of the FIG. 1 tape printing apparatus and component parts associated with the tape exit.

As shown in FIGS. 2, 3, and 4, the tape exit 10 formed in the apparatus casing 3 as described hereinbefore includes a slit portion 10*a* having an open upper end and an expanding opening 10*b* expanding outward from the slit portion 10*a*. The tape cutter 11 is received in a portion of the apparatus casing 3 formed with the slit portion 10*a*, and arranged such that a cutting line (i.e. the position of the cutting edge of the stationary blade 21) L thereof is positioned within the width of the slit portion 10*a*. In the present embodiment, the slit portion 10*a* serves not only as a portion for guiding the printing tape T toward the outside of the apparatus 1, but also as a portion for covering or shielding the tape cutter 11. Further, when the tape cartridge 6 is mounted, the slit portion 10*a* allows the leading end portion of the printing tape T rolled out from the tape cartridge 6 to be inserted therein from above. On the other hand, the expanding opening 10*b* serves not only as a portion for preventing the user's finger from being inserted from the front of the tape exit 10 into the slit portion 10*a* facing the tape cutter 11, but also as a portion for enabling smooth discharge of a cut-off tape strip Ta.

The slit portion 10*a* has a slit 42 defined by left-side and right-side (hereinafter, the stationary blade side is referred to as "the left side", and the movable blade side as "the right side") opening edges 41*a*, 41*b* opposed to each other. The slit 42 includes a tape setting space 43 defined at a location facing the tape cutter 11, for receiving the leading end portion of the printing tape T rolled out from the tape cartridge 6, and a tape guide space 44 extending continuously upward from the tape setting space 43, for guiding the leading end portion of the printing tape T when it is inserted into the tape setting space 43 from above. The left-side and right-side opening edges 41*a*, 41*b* have respective portions opposed in parallel with each other and defining the tape setting space 43 with sufficient space therebetween for allowing a cut-off tape strip Ta to pass therethrough.

In the present embodiment, the portion of the right-side opening edge 41*b* defining the tape setting space 43 is positioned at a location close to the cutting line L of the tape cutter 11, while the corresponding portion of the left-side opening edge 41*a* is positioned at a distance from the cutting line L of the tape cutter 11. That is, the cutting line L is extends at a location slightly offset from the vertical center line of the tape setting space 43 forward the right side. The movable blade 22 arranged on the right side moves toward the stationary blade 21 arranged on the left side and performs a cutting operation on the latter to cut the printing tape T. As a result, a tape strip Ta cut off by the cutting operation of the movable blade 22 is discharged (thrown out) not right along a tape dispensing direction but obliquely in a direction deviated leftward from the tape dispensing direction.

For the above reason, the left-side or stationary blade-side opening edge 41*a* is positioned at the location away from the cutting line L so as to enable smooth discharge of the tape strip Ta. Further, this construction makes it possible to discharge the tape strip Ta smoothly without increasing the width of the tape setting space 43. It should be noted that the cutting line L may be set such that it extends vertically along i.e. at the same location as the right-side opening edge 41*b*.

The portion of the left-side opening edge 41*a* defining the tape guide space 44 is formed such that it protrudes toward the right-side opening edge 41*b*, while the corresponding portion of the right-side opening edge 41*b* is formed such that it sits back to have a complementary shape to the corresponding portion of the left-side opening edge 41*a*, and hence the tape guide space 44 is defined in a manner curved rightward. More specifically, the portion of the left-side opening edge 41*a* defining the tape guide space 44 protrudes rightward to a location in the immediate vicinity of an imaginary line extending straight upward from the portion of the right-side opening edge 41*b* defining the tape setting space 44. Further, the portions of the left-side and right-side opening edges 41*a*, 41*b* defining the tape guide space 44 have respective upper ends thereof formed with sloped surfaces 45, 45 each sloped downward toward the tape guide space 44.

When the leading end portion of the printing tape T is inserted into the tape guide space 44 from above, the leading end portion is guided along the sloped surfaces 45, 45 of the left-side and right-side opening edges 41*a*, 41*b* whereby they are introduced smoothly into the tape guide space 44. Then, the leading end portion passes, while being slightly warped, through the tape guide space 44 formed such that the tape guide space extends in a curved manner as described above and reaches the tape setting space 43. In this case, since the tape guide space 44 is formed such that the tape guide space extends in a curved manner, it is possible to prevent the user's finger from being inserted into the tape setting space 43 facing the tape cutter 11.

The expanding opening 10*b* is defined by left-side and right-side opening walls 47*a*, 47*b* in a manner expanding or broadening toward the outer end thereof. This construction not only makes the tape exit 10 look nice, but also gives the same a sufficient depth to prevent the user's finger from being inserted into the slit (tape setting space 43) 10*a* by accident. A cut-off tape strip Ta is discharged (thrown out) not right along the tape dispensing direction but obliquely in the direction deviated leftward from the tape dispensing direction as described above, so that it is preferable that the left-side opening wall 47*a* extends outward at a wider opening angle than the right-side opening wall 47*b*.

Figure 6:
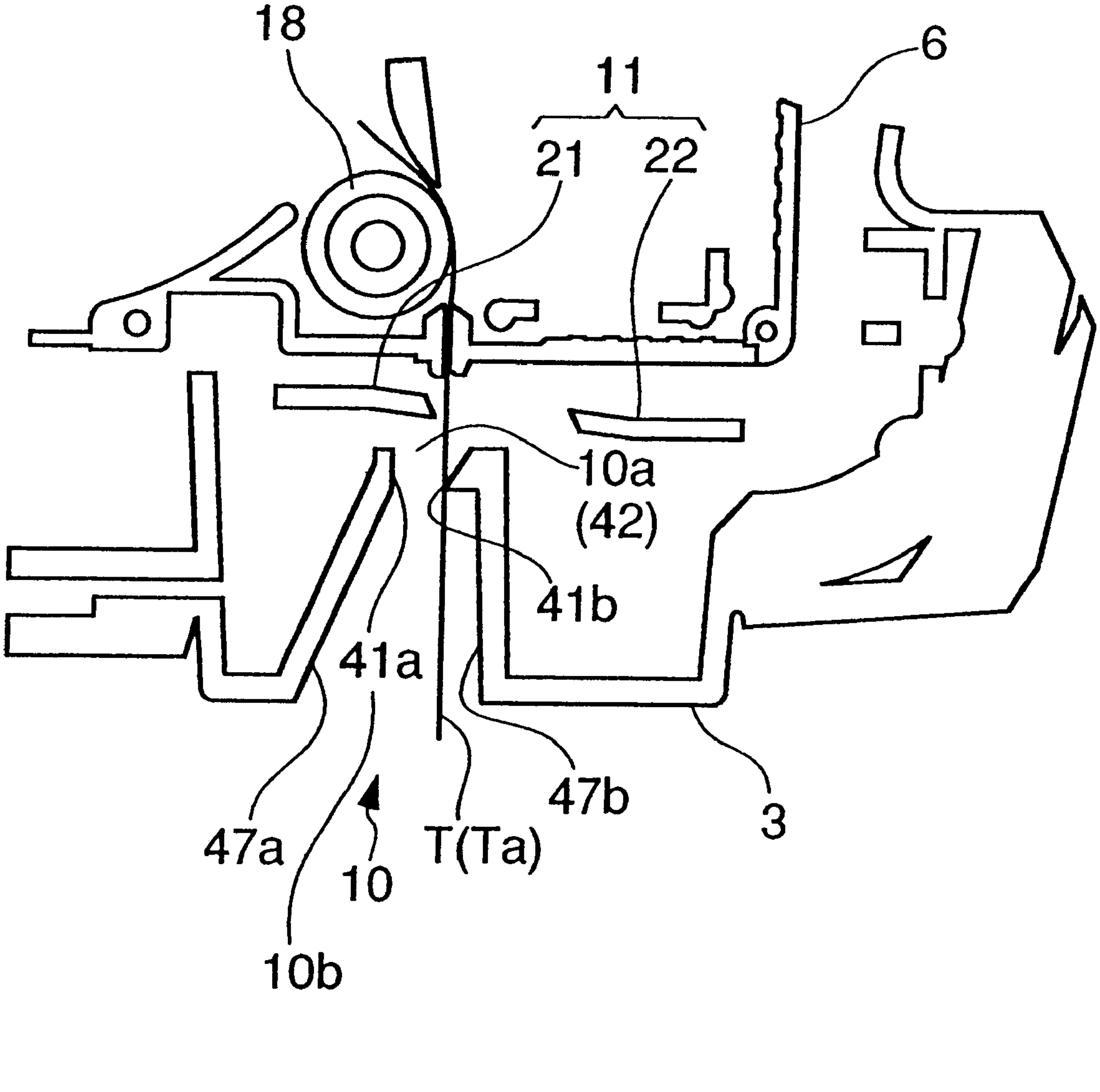
FIG. 6 is a transverse sectional view of a variation of the tape exit and component parts associated therewith.

That is, so long as the tape exit 10 is not degraded in design or appearance, it is preferred that the opening angle of the left-side opening wall 47*a* with respect to the tape dispensing direction is increased, whereas that of the right-side opening wall 47*b* is reduced. Therefore, as in a variation of the above embodiment shown in FIG. 6, the opening angle of the right-side opening wall 47*b* may be zero, i.e. the right-side opening wall 47*b* may extend outward in parallel with the tape dispensing direction. This construction is more effective in preventing the user's finger from being inserted into the slit portion 10*a*, and enables a tape strip Ta to be discharged smoothly without being caught at the tape exit 10.

It is further understood by those skilled in the art that the foregoing is a preferred embodiment of the invention, and that various changes and modification may be made without departing from the spirit and scope thereof.

What is claimed is:

1. A tape printing apparatus including a cartridge compartment in which a tape cartridge containing a printing tape is removably mounted, a tape exit formed such that said tape exit is continuous with said cartridge compartment and in the form of a slit having an open upper end, for discharging a printed portion of said printing tape from said apparatus, and a cutter facing said tape exit, said tape cartridge being inserted into said cartridge compartment, with a leading end portion of said printing tape which is rolled out from said tape cartridge being inserted into said tape exit from above, wherein said tape exit comprises a slit defined by a pair of opening edges opposed to each other, said slit including a tape setting space which said cutter faces, and a tape guide space extending upward continuously from said tape setting space, for guiding said leading end portion of said printing tape when said leading end portion is inserted into said tape setting space from above at the time of mounting said tape cartridge in said cartridge compartment, and one of said pair of opening edges having a flat portion thereof extending upwardly from the tape setting space and terminating in a protruding portion within said tape guide space, the protruding portion extending into said tape guide space and having an upper sloped surface such that said tape guide space extends in a curved manner along a direction of insertion of said leading end portion into said tape setting space from above.

2. A tape printing apparatus according to claim 1, wherein said upper sloped surface slopes downward toward said tape guide space.

3. A tape printing apparatus according to claim 1, wherein said tape exit has a pair of opening walls extending outward from said pair of opening edges, respectively, such that a space between said pair of opening walls broadens toward an outside of said apparatus.

4. A tape printing apparatus according to claim 2, wherein said tape exit has a pair of opening walls extending outward from said pair of opening edges, respectively, such that a space between said pair of opening walls broadens toward an outside of said apparatus.

* * * * *